United States Patent [19]
Siltari

[11] 3,772,761
[45] Nov. 20, 1973

[54] METHOD AND MECHANISM FOR MOUNTING SAW BLADES IN A CIRCLE SAW

[75] Inventor: Arvo Ilmari Siltari, Karhula, Finland

[73] Assignee: A. Ahlstrom Osakeyhtio, Noormarkku, Finland

[22] Filed: Feb. 11, 1972

[21] Appl. No.: 225,564

[30] Foreign Application Priority Data
Feb. 12, 1971 Finland .................................... 408

[52] U.S. Cl. ............... 29/406, 29/200 B, 29/200 P, 29/446, 76/112
[51] Int. Cl... B23q 17/00, B23p 19/00, B23p 11/02
[58] Field of Search ................. 29/406, 446, 200 B, 29/200 P; 76/112

[56] References Cited
UNITED STATES PATENTS
2,980,474  4/1961  Gargan ............................ 29/446 X
3,324,539  6/1967  Cleland ............................... 29/406
3,329,138  7/1967  Luardo ............................ 76/112 X
3,613,211  10/1971  Daggett ............................ 29/200 P

*Primary Examiner*—Thomas H. Eager
*Attorney*—Lorimer P. Brooks et al.

[57] ABSTRACT

In a circle saw the shaft of which is adapted to receive several saw blades provided with center holes and arranged in a predetermined desired relationship to each other, the saw blades are in a first step assembled together with intermediate supporting rings in a separate premounting stand. In this premounting stand the blade assembly is centered and joined rigidly together by securing means, whereby a blade unit formed for mounting onto the saw hub. The blades are suitably prestressed after mounting on the hub, e.g. by expanding the hub radially.

9 Claims, 3 Drawing Figures

PATENTED NOV 20 1973 3,772,761
SHEET 1 OF 2
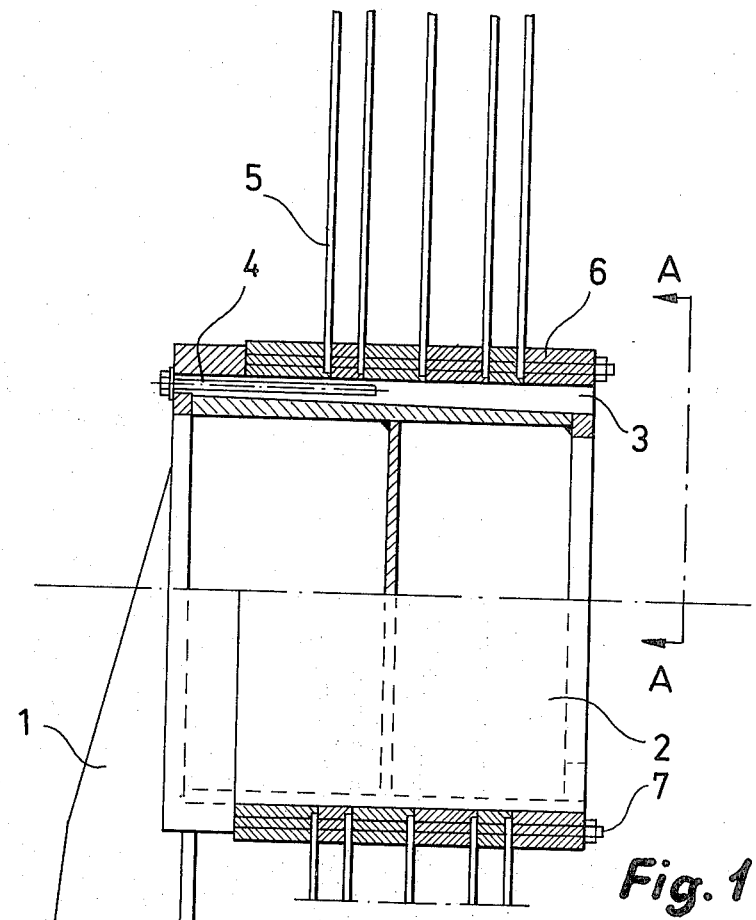
*Fig. 1*
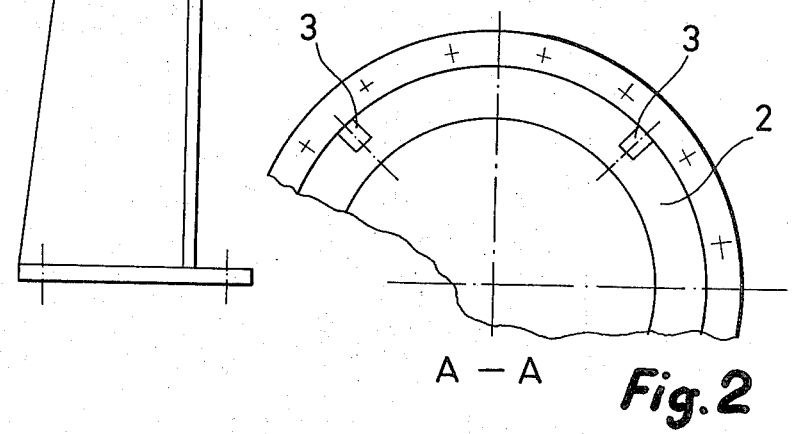
A—A  *Fig. 2*

METHOD AND MECHANISM FOR MOUNTING SAW BLADES IN A CIRCLE SAW

BACKGROUND OF THE INVENTION

1. Field of the Invention

This invention relates to mounting of saw blades on the hub of a circle saw shaft adopted to receive blades with center holes and intermediate supporting rings, the saw blades being preferably prestressed after mounting.

2. Description of the Prior Art

In circle saws the saw blade expands because of the heating during sawing, whereby its rim will expand more than the parts close to the hub, with the result that the blade tends to bend and vibrate. Efforts have been made to prevent this by stretching the saw blade by hammering and rolling. This is very difficult to carry out and demands very skillful workmanship. When the saw blades are reground their diameter decreases and the blades have had to be restretched. In order to avoid this difficulty there has been suggested a method, which is presented in Finnish Pat. No. 37 290, and which is characterized in that the saw blades are prestressed by enlarging the diameter of the holes in the blades so that the blades take on a desired conical form.

In said patent publication there is also disclosed a mechanism for performing the method, in which mechanism the shaft of the saw has a hub carrying the saw blades and provided with a chamber, which is filled with a fluid under pressure that brings about a radial enlargement of a shell bordering the chamber outwards and thus enlargement of the diameter of the blade holes.

As the enlargement of the outer shell of the chamber, which effects the surface of the hole in the saw blades, is very small, the holes must be made with great accuracy. In changing the saw blades the number of the parts to be dismounted and reassembled is great. For instance, each blade must have an intermediate ring. This causes much waste time in the operation of the saw.

The purpose of this invention is to eliminate said difficulties in the mounting of the saw blades and to provide a method and apparatus making the changing of the blades easier and faster.

SUMMARY OF THE INVENTION

According to this invention there is provided a method of the character described, which comprises arranging the blades and the support rings in desired relationship to each other in a separate premounting stand, assembling and centering the blades and support rings in the premounting stand, joining the assembly rigidly together to a readily mountable blade unit, and mounting the blade unit on the hub of the saw shaft.

An apparatus for carrying out said method comprises a premounting stand constructed to receive the blades and supporting rings arranged in the same way with respect to each other, as they will be on the hub of the shaft, means for centering the blades and the supporting rings in the premounting stand, securing means for assembling and joining the blades and supporting rings rigidly together to a mounting unit, and means for prestressing the blades on the hub.

The fundamental idea of the invention is that all parts belonging to the final blade unit, such as blades and supporting rings, are centered and fastened to each other in the separate stand so as to form an assembled blade package ready to be mounted on the hub. Thus there will in practice be needed at least two series of blades.

The apparatus of the invention may be constructed more suitably than the hub of the saw itself for centering of the blades and other parts of the unit, so that mounting is facilitated although it will comprise the additional premounting step.

Above all the premounting essentially shortens the time needed for the changing of blades, i.e. the downtime of the saw. Also the precision demand on the holes of the blades is essentially less than before, as the strength that is needed for prestressing of the blades is transferred over the side surfaces of the blade rather than the perimeter of the hole,

BRIEF DESCRIPTION OF THE DRAWINGS

FIG. 1 shows an apparatus according to the invention partly in section,

FIG. 2 shows a section along the line A - A in FIG. 1 and

DESCRIPTION OF THE PREFERRED EMBODIMENT

Figure 3:
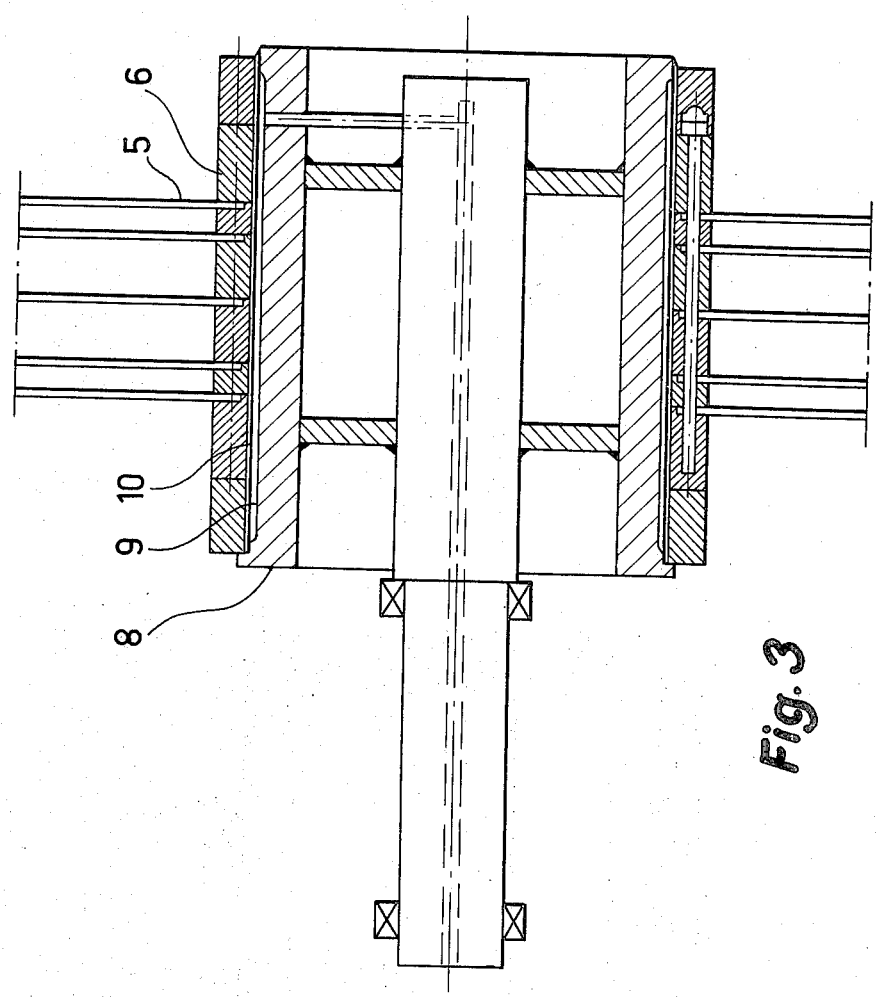
FIG. 3 shows the hub of the circle saw, where the blades are mounted in their places respectively.

In FIGS. 1 and 2 the reference number 1 indicates a mounting stand, which comprises a cylindrical drum 2, where two oblique wedges 3 are fitted at a distance of 90° from each other in the direction of the periphery. The wedge 3 can be moved in an inclined groove with regard to the shaft of the drum by means of a screw 4 extending into the groove from the opposite side. The prefitting of the saw blades 5 with the supporting rings 6 is performed on the periphery of the drum 2 and the centering of the rings is achieved by tightening the screws 4, whereby the wedges 3 will be forced against the supporting rings 6. The supporting rings have a cylindrical guiding surface for centering of the saw blades. Moreover there may, on one side surface of the supporting rings as in the figures, or alternately on both side surfaces be provided a ringshaped shoulder, which reaches into the central hole of the blade. In the former case the width of the shoulder is slightly less than the blade thickness and in the latter case slightly less than half of the blade thickness, whereby is ensured that the side surfaces of the supporting rings bear against the blades independent of changes in the blade thickness.

When the blades and supporting rings have been centered they are joined together to a premounting unit by means of screws 7 extending in axial direction through the whole package and most suitably distributed equally over the periphery of the supporting rings. The pressure applied by of the screws is so great that the torque for sawing is transferred from the supporting rings to the saw blades by way of frictional force.

The assembled ready blade package is mounted as such on the hub 8 of the shaft of the saw (FIG. 3). The hub of the circle saw may be of the type mentioned in the introduction of this description and provided with a chamber 9 defined outwardly by a thin shell 10, which chamber is connected to a pressure medium source. When the chamber 9 is filled with medium under pressure, the enlargement of the shell 10 brings about by way of the supporting rings an enlargement of the diameter of the blade hole and thereby prestresses the blades.

What is claimed is:

1. A method for mounting saw blades on the hub of a circle saw shaft adapted to receive blades with holes in their centers and supporting rings between the blades and outside the outermost blades of a set of blades, which comprises arranging the blades and the support rings in a desired relationship to each other in a separate premounting stand, assembling and centering the blades and support rings in the premounting stand, joining the assembly rigidly together to form a readily mountable blade unit, mounting the blade unit on the hub of the saw shaft, and prestressing the blades in the blade unit after mounting on the hub by expanding the hub radially.

2. Apparatus for mounting saw blades on the hub of a circle saw shaft of the type adapted to receive blades with center holes and supporting rings between the blades and outside the outermost blades of a set of blades, the hub being provided with tightening means for prestressing the blades after mounting by radial expansion of the hub, comprising a premounting stand constructed to receive the blades and supporting rings arranged in the same way with respect to each other as the rings and blades will be on the hub of the saw, means for centering the blades and the supporting rings in the premounting stand, and securing means for assembling and joining the blades and supporting rings rigidly together after centering to form a unity ready for mounting.

3. Apparatus according to claim 2, wherein the premounting stand is provided with a cylindrical drum for receiving the blades and supporting rings during centering and assembling of the blades and rings to form a mounting unit.

4. Apparatus according to claim 3, wherein the periphery of the drum has axial grooves for receiving wedges slidable in the lengthwise direction of the drum.

5. Apparatus according to claim 4, wherein the inside end of the wedge has a screwlike hole, so that the wedge may be forced inwards by means of a screw extending into the groove.

6. Apparatus according to claim 2, wherein the supporting ring at least on one side side surface is provided with a ringshaped shoulder for carrying of the blade at its center hole.

7. Apparatus according to claim 6, wherein one side surface of the supporting ring between the blades has a ring-shaped shoulder, the width of which is slightly smaller than the blade thickness.

8. Apparatus according to claim 6, wherein both side surfaces of the supporting ring between the blades have a ring-shaped shoulder, the width of which is slightly smaller than half of the blade thickness.

9. Apparatus according to claim 2, wherein the blades and supporting rings are provided with axial holes extending therethrough and equally distributed over the periphery of the rings, the securing means for assembling the mounting unit being formed by bolts extending through said holes.

* * * * *